Patented Apr. 1, 1941

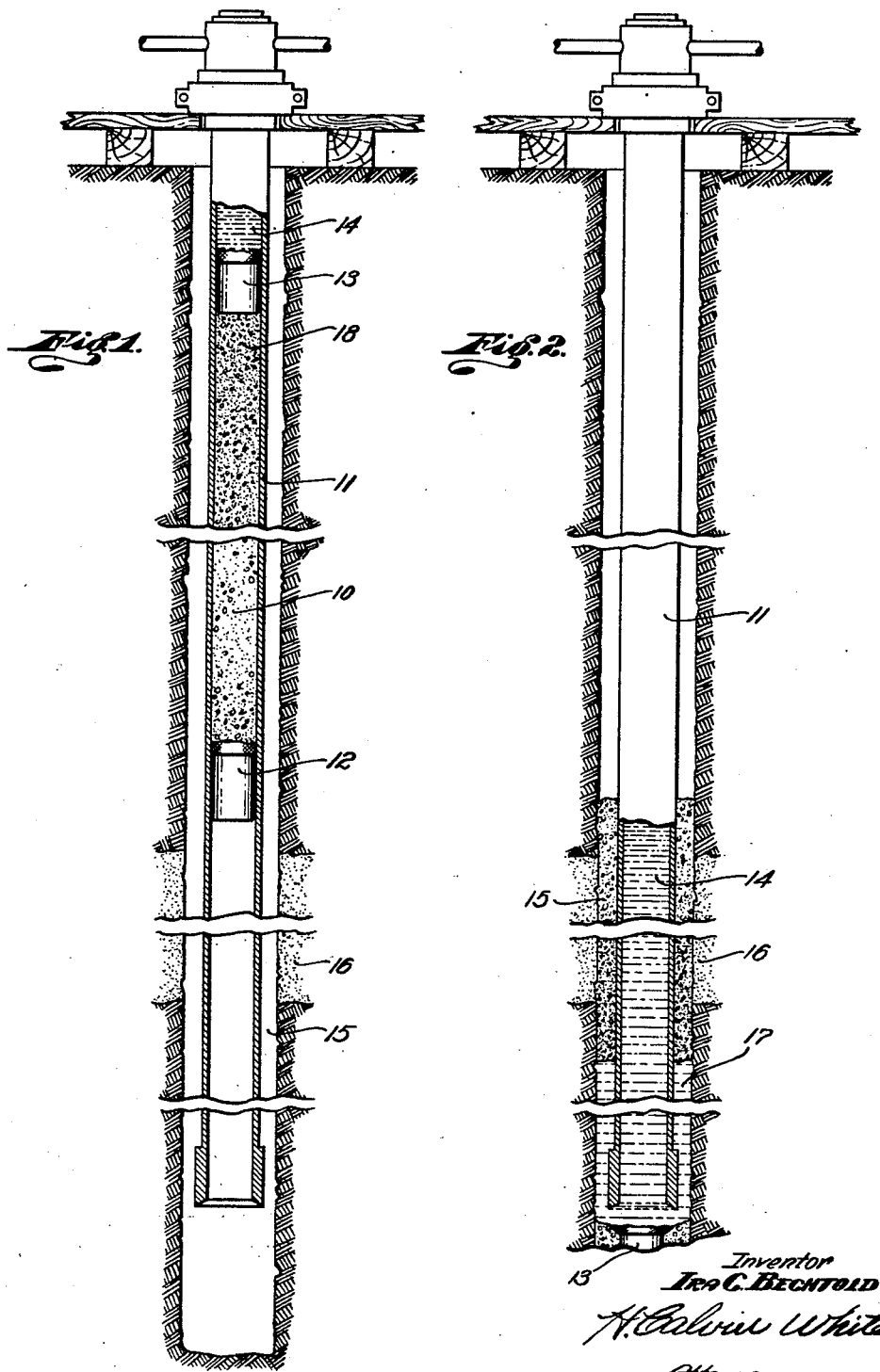

2,236,987

UNITED STATES PATENT OFFICE 2,236,987

METHOD OF CEMENTING WELLS

Ira C. Bechtold, Colton, Calif., assignor to California Portland Cement Company, Los Angeles, Calif., a corporation of California Application January 4, 1939, Serial No. 249,251

6 Claims. (Cl. 166—21)

This invention has to do with improvements in oil well cements and processes for cementing wells. In particular, the invention is directed to certain advancements departing from the past and conventional practices, whereby it is possible to insure more accurate placement of a cement in better condition and possessed of properties enabling it more effectively to seal off the zone to be isolated, than have been obtainable in the past.

In the cementing of wells to isolate water bearing strata from other portions of the formation to be subsequently drilled, or to seal the formation against the circulation of waters or drilling muds, it is highly desirable to have cements that will produce water-cement mixtures possessing physical properties especially adapted and suited to the conditions existing in the well and encountered in well cementing operations. Ordinarily in such operations the neat cement is put into place by methods involving the use of drilling muds to force the body of cement slurry into position, or to maintain the cement slurry in position during the setting stage. Difficulties have in the past been encountered because of the inherently great differences in effective specific gravity between the cement slurry and the drilling muds used. Cement slurries of the type commonly used exhibit effective densities which are considerably greater than the densities of common drilling muds. For example, a drilling mud may have a density corresponding to from 70 to 80 lbs. per cubic foot, whereas the density of the cement slurry may correspond to from 110 to 125 lbs. per cubic foot, depending upon the particular cement used and the water-cement ratio of the slurry. Such large differences in the effective densities of the two suspensions make it difficult to maintain an hydraulic balance between them in a column where, for example, it is desired to carry a body of cement slurry above a column of drilling mud. Under such conditions a considerable amount of the cement slurry will tend to settle into the drilling mud column and be removed from the zone in which it has been placed, and the resultant mixing of the cement slurry and drilling mud may cause such dilution of the cement that it becomes impossible to effect satisfactory cementing of the particular zone to be sealed.

One major purpose of this invention is to utilize in well cementing operations a cement which, when mixed with water, will yield a slurry having an effective specific gravity which is very much less than would be obtained with cements heretofore used. In accordance with the invention, it is possible to provide slurries which exhibit specific gravities that may be only slightly greater, or even less than those of commonly used drilling muds, or of muds whose composition is adjusted so that their densities will be only slightly less, or even greater than the density of the cement.

Another desirable property for a well cement slurry is that it be capable of being pumped easily and carried through the pumping system, piping, casing, etc., with a minimum of applied pressure. The present cement yields a slurry of unusual mobility as compared with slurries made from cements which have been used up to the present. By unusual mobility, I mean that the slurry made from the cement has the property of unusually high rate of increase in rate of flow with increases in pressure. It is also desirable that a well cement have the capability of maintaining position after being placed in any particular location. This property is associated with yield point or the pressure required to cause the inception of flow in the slurry. Cements used heretofore exhibit yield points which are far below the desired level when made into slurries of pumpable consistency. Slurries made of the present cement have substantially higher yield points than have been obtainable with the commonly used cements, and the pumpability of such slurries is not impaired, but is actually much greater because of the greater mobility of the slurry.

A further feature to be desired in well cement slurries is the property of remaining fluid for a period of time sufficient to allow placement of the cement slurry column in the desired location. That is to say, the setting and hardening reactions of the cement must be so controlled that they are retarded to the extent that the fluidity of the slurry will not seriously be impaired by increasing rigidity resulting from the setting action of the cement. The present cement is capable of producing slurries which retain their fluidity and are pumpable for considerable periods of time even at relatively high temperature. In this respect, they compare favorably with the most satisfactory cements which are now in common use.

The present cement is further distinguished from many, if not the vast majority of cements heretofore attempted to be used in well cementing, in that it preferably is ground to relatively high fineness. In the past, the common practice has been to grind cements coarsely to enhance some of the properties discussed above. However, this has not been a satisfactory means to the end since coarsely ground cements tend to settle in slurry suspensions and segregation occurs. It is also difficult to produce workable slurries from such cements because coarsely ground cements tend to produce harsh mixtures at all water-cement ratios. The present invention permits the use of cements which are unusually finely divided and possessed of many desirable properties attributable to fine grinding, and at the same time enables the cement to display those properties which it has been attempted in the past to obtain by coarser grinding, but without the resultant disadvantages mentioned.

As previously indicated, one of my main objectives is to utilize a Portland cement slurry of abnormally low specific gravity, i. e., abnormally in the sense that its specific gravity is substantially below the specific gravity of other heretofore used slurries of corresponding water-cement ratio, and in much closer conformity with the specific gravity of the circulating fluid or drilling mud. Generally speaking, this object is accomplished by providing an aerated cement slurry in which the air content is substantially in excess of the quantity of air that normally would be contained in the dry cement, or put into a wet cementitious mixture as a result merely of the usual mechanical operations for mixing water and cement. Such cement or slurry is referred to as being abnormally aerated. It is to be understood that in the broad aspects of the invention, I may incorporate in the cement or slurry the required amount of air or suitable gas necessary to give the slurry its desired reduced specific gravity, by any suitable method or means. Preferably, though typically, I employ a method of aerating the cement of the type disclosed in a copending application of Ira C. Bechtold and Harry E. Kaiser, Serial No. 251,046 filed January 14, 1939, for Portland cements. In accordance with that method, the air is artificially held in the cement, i. e., by a medium other than the cement or slurry alone, small particles or films of the air being held and retained within the slurry, in direct association with individual cement particles, and also perhaps otherwise as later mentioned. In this manner, it becomes possible to retain in the cement an amount of air such that when the cement is made into a water slurry, the specific gravity of the slurry will be considerably below the specific gravity of a slurry composed of ordinary Portland cement and a corresponding percentage of water.

In accordance with the process described in the application referred to above, a suitable Portland cement is intimately admixed or interground with a small percentage of a gasoline-insoluble wood resin, commercially known under the trade name "Vinsol." This gasoline-insoluble resin which I use, and refer to hereinafter simply as "the resin," may be produced by extracting resinous pine wood with a coal tar hydrocarbon, removing the hydrocarbon by evaporation, leaving a residue comprising a mixture of wood rosin and the gasoline insoluble resin. This resin then is separated from the wood rosin by extracting the latter by a suitable petroleum hydrocarbon in which the wood rosin is soluble.

When interground with Portland cement clinker, together with added gypsum if desired, the resin causes the finished cement to have thin films of air adsorbed upon its surface and causes these films to be retained, or additional air to become adsorbed and held to the cement particles, when the cement is mixed with water to form a slurry or other cementitious mixture. It is to be understood that by this method of aeration, the adsorbed air is not present as large bubbles or in a form such as to cause the slurry to exhibit foaming or frothing tendencies, but is present as extremely minute films distributed throughout the slurry mass on the cement particles. It may be mentioned that additional air may at the same time be present and held in the cement in the form of small particles or bubbles interspersed between the cement particles, but like the above mentioned air films, held in the slurry by virtue of the air stabilizing property of the resin. The resin may be incorporated in the cement in an amount determinable in accordance with the properties desired in the cement slurry. This amount will usually be about 0.5%, or somewhat more, by weight of the (dry) finished cement, but may be varied within limits as required by the properties to be developed in the cement. In general, 0.5% by weight of the resin will produce satisfactory specific gravities and fluidity when the cement is mixed with water to form a slurry. Smaller amounts of resin will result in increased specific gravity and somewhat lower mobility of the slurry paste. The fineness to which the cement is ground may be that which is common for regular Portland cements or preferably somewhat higher. For example this fineness may be defined as a specific surface of 1500 to 1800 square centimeters per gram and preferably as high as 2200 square centimeters per gram, as determined by the instrument known as the Wagner turbidimeter which is described in Proceedings of the American Society for Testing Materials, vol. 33, part II, page 553, 1933.

Although it is preferred to intergrind the resin by introducing it into the unground clinker and gypsum as hereinabove described, other methods of distribution of the resin throughout the cement may also be employed. For example, if a two stage grinding process is used the clinker and gypsum may be ground without the resin in the first stage and the resin may be introduced following this grinding operation so that the resin-cement mixture is subjected to intergrinding in the second grinding stage. The resin may also be finely divided and merely mixed with finished cement in a suitable mixing apparatus or it may be distributed throughout the cement by such a process as that described in my copending application Serial Number 185,309, filed January 17, 1938.

The table below shows densities relating to slurries made with a cement produced in accordance with this invention as compared with densities obtained with a cement of ordinary type. The slurries were all prepared, as nearly as possible, by identical procedures of mechanical stirring. Cement A is the cement of this invention while Cement B is the comparison cement of the ordinary type. Cement A is ground to a specific surface of about 2100 square centimeters per gram and contains 0.5% by weight of the resin.

*Table I*

| Water cement ratio by weight | Weight per cubic foot in pounds | |
|---|---|---|
| | A | B |
| 0.40 | 97 | 124 |
| 0.45 | 89 | 120 |
| 0.50 | 85 | 115 |
| 0.55 | 81 | 112 |

It is evident that Cement A yields a slurry having a markedly lower density than does the ordinary cement, and other tests made but not tabulated in detail, indicate its disinguishing and characteristic properties in the various other respects discussed in the foregoing.

In practising the invention, the cement may be deposited in the particular well zone to be sealed, by any of the customary and conventional methods. A usual and typical method is illustrated in the accompanying drawing in which Fig. 1 is a sectional view showing a body of the cement being dumped downwardly through the well casing, and Fig. 2 is a similar view showing the cement displaced upwardly around the casing to a relatively high shut-off zone.

It will suffice to state that in accordance with the usual procedure, a measured quantity of the cement 10 is introduced to a well pipe or casing 11, commonly preceded and followed by plugs 12 and 13, and is forced by pressure applied to a column of noncementitious fluid or circulating mud 14 down into the well and upwardly around the casing to the zone 15 opposite the formation 16 to be cemented off. Because of the low specific gravity of the cement, it is possible to elevate the cement considerably above the casing shoe, by means of a rising column of the circulating mud. Thus, in Fig. 2 the cement is shown to be deposited by and above the mud column 17 in the shut-off zone 15 located some distance above the lower end of the casing. As will be understood, however, in other instances the relative positions of the casing and formation 16 may be such that the latter lies opposite the bottom or lowermost section of the casing. By using the present type of cement, the effective specific gravity of the cement slurry may be sufficiently low as not to exceed substantially the effective specific gravity of the circulating mud, or to equal or even be less than the specific gravity of the mud, so that in being finally placed, the cement is prevented from gravitating or settling into the mud column and thereby becoming diluted by the mud and displaced from the cementing zone. It may also be mentioned that with the cement inherently possessed of a comparatively low specific gravity, the composition of the mud, i. e., the percentage of solids in the mud, may be adjusted to maintain the above mentioned desired relationship between the specific gravities of the mud and cement slurry.

I have previously spoken of the superior fluidity and pumpability of the cement, as well as its higher yield point and sustained fluidity, all of which properties render the cement especially suited to well cementing operations. In addition to these properties, the cement has certain other characteristics that not only further enhance its value as a cement, but also give it certain advantages appurtenant to the cementing process as a whole.

In the first place, the reduced specific gravity of the cement slurry is responsible for a substantial reduction in the circulating fluid pressure required to elevate the slurry to the cement zone, and the pressure, due to hydrostatic head, imposed by the mud-cement column on the formation. In addition, the cement during the course of setting and hardening, undergoes considerably greater expansion than ordinary cements, with the result that, in expanding, the cement tends to seal more tightly the formation and other surfaces with which it is in contact. Also, due to its expansibility, the cement tends to penetrate the formation to a greater extent than ordinary cements, and thereby to more effectively seal the formation against fluid leakage past the cement barrier. The abnormal expansibility of the cement is due to the expansion of its adsorbed air at the elevated temperatures in the well and also as a result of the heat of hydration that develops in the cement during setting. With the adsorbed air constituting the expansive medium, the advantages of expansibility in the cement are preserved without danger of the well pipe or casing becoming collapsed by the expansion pressure, since the application of pressure is in effect cushioned by the adsorbed air and limited as applied to materials of such strength as the usual well pipe or casing, and for the further reason that during the period when the expansion is the greatest, the cement is still a mobile mass, displaceable by and in accordance with internally developed pressures.

In particular instances it may be desirable to have at the lower end of the cement column as ultimately placed in the well, a cement which will develop an early strength or ultimate strength, or both, to a greater degree than the aerated cement above. For this purpose, the body 10 of aerated cement initially introduced to the well pipe or casing may be immediately followed by a body 18 of unaerated or relatively dense cement which, when the cements finally are elevated to setting position around the casing, will develop greater early or ultimate strength than the aerated cement above. Ordinarily the added body 18 of the more dense cement can be used to best advantage in cementing off formation located opposite the bottom sections of the casing. Where the entire body of cement is to be elevated above a mud fluid column, the dense cement is subject to greater dilution, because of its settling tendency, than the lighter aerated cement.

After setting and hardening, the aerated cement is possessed of certain additional properties of particular advantage for the purposes of an oil well cement. It has what may be regarded as a tougher or less brittle consistency as compared with the usual oil well cements, with the result that it is less susceptible to cracking and cleavages. But at the same time it is relatively easily drilled through if the occasion arises. Thus, after placement and hardening the cement is less susceptible to becoming shattered or cracked as a result of vibrations transmitted to it from various possible operations within the well. And when, as the occasion frequently arises, it becomes necessary to drill through a body of the cement, e. g., through a cement bridge, or a quantity of cement remaining in the casing or well after a cementing job, the fact that the cement does not have the usual extreme hardness and density renders it more easily drillable than the ordinary cement.

It will be understood that the specific gravity of the cement may be adjusted, either on an absolute basis or with relation to the specific gravity of the circulating mud, by varying the air content of the cement within a substantial range. However, I prefer in general to maintain the specific gravity of the cement slurry at a maximum well below the specific gravities of ordinary well cement slurries. This preferred maximum may be defined in terms of weight per cubic foot of the slurry (since that basis of measurement is commonly used), as the specific gravity of a slurry having a water-cement ratio of 0.50 and a weight per cubic foot not substantially in excess of 90 pounds.

I claim:

1. The process of cementing off formation in a vertically extending zone between a well casing and the formation, that includes introducing to said zone a body of Portland cement having air films held directly to individual particles of the cement by a gasoline-insoluble, pine wood resin obtainable by extracting resinous wood with a coal tar hydrocarbon, removing said hydrocarbon by evaporation, leaving a residue comprising wood rosin and gasoline insoluble resin, and extracting wood rosin from said residue by a petroleum hydrocarbon, said body of cement exerting by reason of its air content an abnormally low hydrostatic pressure.

2. The process of cementing off formation in a vertically extending zone between a well casing and the formation, that includes introducing to said zone a column of low density cement containing dispersed air particles held in the cement by a stabilizing medium and in an amount such that the cement when admixed with water at a water-cement ratio of 0.50 forms a highly mobile slurry having a specific gravity under that corresponding to a slurry weight of substantially 90 lbs. per cubic foot, said cement by virtue of its low density exerting an abnormally low hydrostatic pressure.

3. The process of cementing off formation in a vertically extending zone between a well casing and the formation, that includes introducing to said zone a column of low density, abnormally aerated and highly mobile cement which when admixed with water at a water-cement ratio of 0.50% forms a slurry having a specific gravity under that corresponding to a slurry weight of substantially 90 lbs. per cubic foot, said cement containing a stabilizing medium coating the individual cement particles and causing air particles to be adsorbed thereon and said cement exerting by virtue of its resultant low density an abnormally low hydrostatic pressure.

4. The process of cementing off formation in a vertically extending zone between a well casing and the formation, that includes introducing to said zone a highly mobile body of low specific gravity, abnormally aerated cement containing uniformly dispersed air particles held therein by a stabilizing medium, said cement having by reason of its air content abnormally increased expansibility during hydration, and allowing the cement to harden and expand within said zone.

5. The process of cementing off formation in a vertically extending zone between a well casing and the formation, that includes introducing to said zone a body of highly mobile, abnormally aerated Portland cement containing uniformly dispersed air particles held therein by a resinous stabilizing medium coating the cement particles, the cement having by reason of its air content an abnormally low specific gravity and exerting therefore an abnormally low hydrostatic pressure.

6. The process of cementing off formation in a vertically extending zone between a well casing and the formation, that includes introducing to said zone a body of highly mobile Portland cement having air particles held to individual particles of the cement by a stabilizing medium and the cement having by reason of its air content an abnormally low specific gravity and exerting therefore an abnormally low hydrostatic pressure.

IRA C. BECHTOLD.